United States Patent
Jeong

(10) Patent No.: US 9,519,833 B2
(45) Date of Patent: Dec. 13, 2016

(54) LANE DETECTION METHOD AND SYSTEM USING PHOTOGRAPHING UNIT

(71) Applicant: MANDO CORPORATION, Pyeongtaek-si, Gyeonggi-do (KR)

(72) Inventor: Seung Hwan Jeong, Yongin-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/307,917

(22) Filed: Jun. 18, 2014

(65) Prior Publication Data

US 2015/0104072 A1   Apr. 16, 2015

(30) Foreign Application Priority Data

Oct. 11, 2013  (KR) ......................... 10-2013-0121019

(51) Int. Cl.
*G06K 9/00* (2006.01)
*G06T 11/60* (2006.01)
(Continued)

(52) U.S. Cl.
CPC ......... *G06K 9/00798* (2013.01); *G06T 7/0085* (2013.01); *G06T 7/602* (2013.01); *G06T 11/60* (2013.01); *G06T 2207/30256* (2013.01)

(58) Field of Classification Search
CPC ............ G06K 9/00798; G06K 9/00805; G06K 9/00201; G06K 9/6201; G06T 11/60; G06T 7/0042; B60R 2300/107; B60T 2201/08; B60W 30/00; H04N 13/0203; H04N 7/181
See application file for complete search history.

(56) References Cited

U.S. PATENT DOCUMENTS

| | | | |
|---|---|---|---|
| 6,091,833 A | * | 7/2000 | Yasui et al. .................... 382/104 |
| 2005/0125121 A1 | * | 6/2005 | Isaji et al. ........................ 701/36 |

(Continued)

FOREIGN PATENT DOCUMENTS

KR   10-2005-0043006 A   5/2005

*Primary Examiner* — Jingge Wu
(74) *Attorney, Agent, or Firm* — McDermott Will & Emery LLP

(57) ABSTRACT

A lane detection method includes acquiring an image in front of a vehicle using a photographing unit provided in the vehicle, detecting, from the acquired image, a positive edge (P.E.) in which a right pixel has a higher brightness value than a brightness value of a left pixel, detecting, from the acquired image, a negative edge (N.E.) in which a left pixel has a higher brightness value than a brightness value of a right pixel, generating a first expansion image by expanding a pixel by a length corresponding to a width of a lane on a right side of the positive edge (P.E.), generating a second expansion image by expanding the pixel by the length corresponding to the width of the lane on a left side of the negative edge (N.E.), and detecting the lane by combining the first expansion image and the second expansion image. In addition, a lane detection system includes a photographing unit that is provided in a vehicle to acquire an image in front of the vehicle, an edge detection unit that detects, from the image in front of the vehicle, a positive edge (P.E.) in which a right pixel has a higher brightness value than a brightness value of a left pixel and a negative edge (N.E.) in which a left pixel has a higher brightness value than a brightness value of a right pixel, an edge expansion unit that generates a first expansion image by expanding a pixel by a length corresponding to a width of a lane on a right side of the positive edge (P.E.) and generates a second expansion image by expanding the pixel by the length corresponding to the width of the lane on a left side of the negative edge (Continued)

(N.E.), and a lane detection unit that detects the lane by combining the first expansion image and the second expansion image.

3 Claims, 9 Drawing Sheets

(51) Int. Cl.
   *G06T 7/00* (2006.01)
   *G06T 7/60* (2006.01)

(56) References Cited

U.S. PATENT DOCUMENTS

| | | | |
|---|---|---|---|
| 2008/0317282 A1* | 12/2008 | Unoura | 382/103 |
| 2009/0028388 A1* | 1/2009 | Amagasaki | 382/104 |
| 2009/0201370 A1* | 8/2009 | Otsuka et al. | 348/148 |
| 2010/0054538 A1* | 3/2010 | Boon | 382/104 |
| 2010/0110193 A1* | 5/2010 | Kobayashi | 348/149 |
| 2010/0189306 A1* | 7/2010 | Kageyama et al. | 382/104 |
| 2010/0238283 A1* | 9/2010 | Kim | 348/135 |
| 2012/0057757 A1* | 3/2012 | Oyama | 382/104 |
| 2012/0229644 A1* | 9/2012 | Suzuki et al. | 348/148 |

\* cited by examiner

LANE DETECTION METHOD AND SYSTEM USING PHOTOGRAPHING UNIT

RELATED APPLICATIONS

This application claims the benefit of Korean Application No. 10-2013-0121019, filed on Oct. 11, 2013, the disclosures of which is incorporated by reference herein.

BACKGROUND

1. Field of the Invention

The present invention relates to a lane detection method and system using a photographing unit, and more particularly, to a lane detection method and system which may efficiently detect a lane based on a photographing unit provided in a vehicle.

2. Discussion of Related Art

In recent years, research and development on a driving assistance system for a vehicle such as unmanned traveling, cruise traveling, and the like have been carried out. Thus, for this, a lane drawn on a road needs to be detected, and research on various methods for detecting the lane has been also conducted.

Conventionally, a land detection method may be classified into a model-based detection method, a feature point-based detection method, and an area-based detection method. Among these, the feature point-based detection method is most widely used due to its simple detection method.

In the feature point-based detection method, lane detection is performed in such a manner that edges of an object are detected within a Region Of Interest (ROI) of an image and only the edge corresponding to the lane among the detected edges is extracted.

In this instance, in an existing method, a convolution operation is performed on a mask such as Sobel, Robert, or the like within the ROI when detecting the edges, and a point in which an absolute value of the result of the convolution operation exceeds a certain limit is regarded as the edge.

However, in such an existing method, the calculation process is complex and an error is highly likely to occur in the final detection result. This is likely to cause a vehicle accident, resulting in degradation in the safety.

Therefore, there is a demand for a method for solving the above-described problems.

The related art includes Korean Patent Laid-open Publication No. 10-2005-00430006.

SUMMARY OF THE INVENTION

The present invention is directed to a lane detection method and system using a photographing unit which may efficiently perform lane detection and provide accurate detection results.

The technical objectives of the invention disclosure are not limited to the above disclosure, other objectives may become apparent to those of ordinary skill in the art based on the following descriptions.

According to an aspect of the present invention, there is provided a lane detection method including: acquiring an image in front of a vehicle using a photographing unit provided in the vehicle; detecting, from the acquired image, a positive edge (P.E.) in which a right pixel has a higher brightness value than a brightness value of a left pixel; detecting, from the acquired image, a negative edge (N.E.) in which a left pixel has a higher brightness value than a brightness value of a right pixel; generating a first expansion image by expanding a pixel by a length corresponding to a width of a lane on a right side of the positive edge (P.E.); generating a second expansion image by expanding the pixel by the length corresponding to the width of a lane on a left side of the negative edge (N.E.); and detecting the lane by combining the first expansion image and the second expansion image.

Here, before the generating of the first expansion image and the generating of the second expansion image, the lane detection method may further include calculating the number of pixels corresponding to the width of a lane.

Also, the calculating of the number of pixels corresponding to the width of a lane may use a height of the photographing unit provided in the vehicle and an inclination of the photographing unit to a horizontal plane.

According to an aspect of the present invention, there is provided a lane detection system including: a photographing unit that is provided in a vehicle to acquire an image in front of the vehicle; an edge detection unit that detects, from the image in front of the vehicle, a positive edge (P.E.) in which a right pixel has a higher brightness value than a brightness value of a left pixel and a negative edge (N.E.) in which a left pixel has a higher brightness value than a brightness value of a right pixel; an edge expansion unit that generates a first expansion image by expanding a pixel by a length corresponding to a width of a lane on a right side of the positive edge (P.E.) and generates a second expansion image by expanding the pixel by the length corresponding to the width of a lane on a left side of the negative edge (N.E.); and a lane detection unit that detects the lane by combining the first expansion image and the second expansion image.

Here, the lane detection system may further include a pixel calculation unit that calculates the number of pixels corresponding to the width of a lane.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, a lane detection method and system using a photographing unit according to an exemplary embodiment of the present invention will be described in detail with reference to the accompanying drawings.

Figure 1:
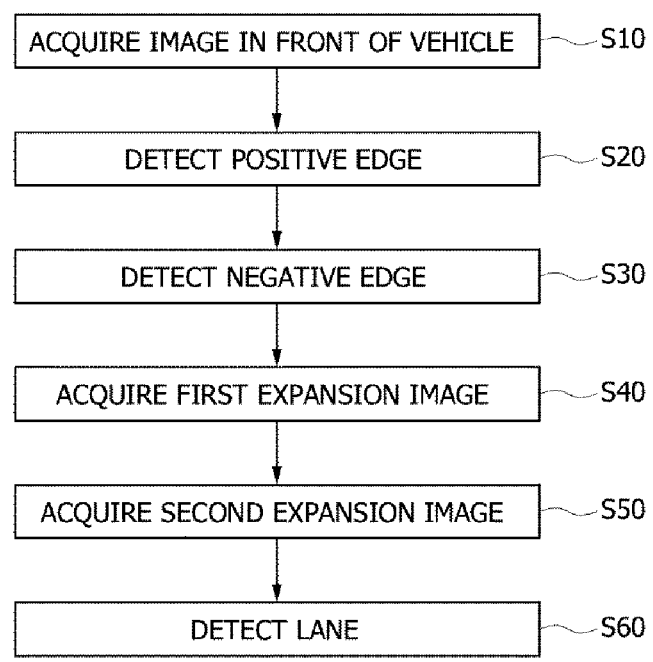
FIG. 1 is a flowchart illustrating each step of a lane detection method according to an embodiment of the present invention.
Figure 2:
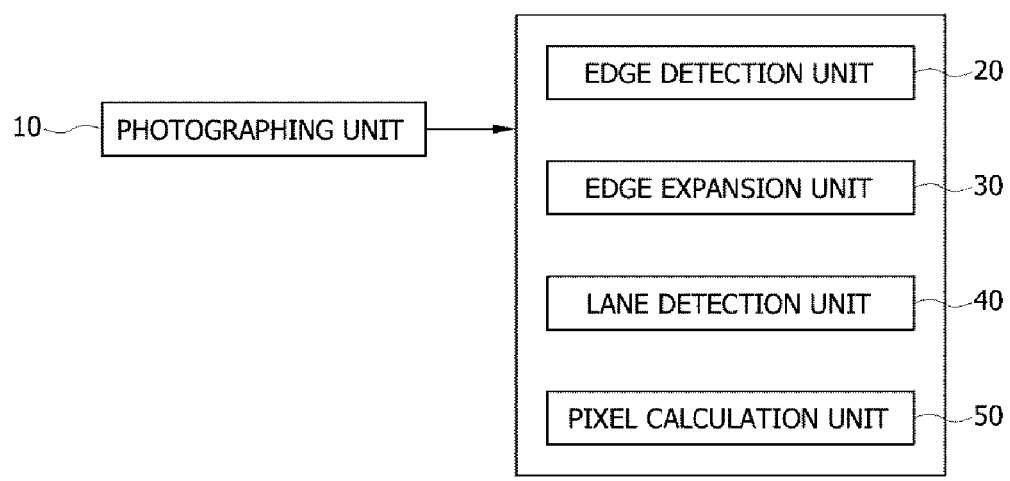
FIG. 2 is a system configuration diagram for performing a lane detection method according to an embodiment of the present invention.

FIG. 1 is a flowchart illustrating each step of a lane detection method according to an embodiment of the present invention, and FIG. 2 is a system configuration diagram for performing a lane detection method according to an embodiment of the present invention.

As shown in FIG. 1, the lane detection method according to an embodiment of the present invention includes acquiring S10 an image in front of a vehicle using a photographing unit provided in the vehicle, detecting S20, from the acquired image, a positive edge in which a right pixel has a higher brightness value than a brightness value of a left pixel, detecting S30, from the acquired image, a negative edge in which a left pixel has a higher brightness value than a brightness value of a right pixel, generating S40 a first expansion image by expanding a pixel by a length corresponding to a width of a lane on a right side of the positive edge, generating S50 a second expansion image by expanding the pixel by the length corresponding to the width of the lane on a left side of the negative edge, and detecting S60 the lane by combining the first expansion image and the second expansion image.

In addition, as shown in FIG. 2, the lane detection system according to an embodiment of the present invention for performing each step of the lane detection method includes a photographing unit that is provided in a vehicle to acquire an image in front of the vehicle, an edge detection unit that detects, from the image in front of the vehicle, a positive edge in which a right pixel has a higher brightness value than a brightness value of a left pixel and a negative edge in which a left pixel has a higher brightness value than a brightness value of a right pixel, an edge expansion unit that generates a first expansion image by expanding a pixel by a length corresponding to a width of a lane on a right side of the positive edge and generates a second expansion image by expanding the pixel by the length corresponding to the width of the lane on a left side of the negative edge, and a lane detection unit that detects the lane by combining the first expansion image and the second expansion image.

Hereinafter, each step of the above-described lane detection method according to an embodiment of the present invention will be described in detail.

Figure 3:
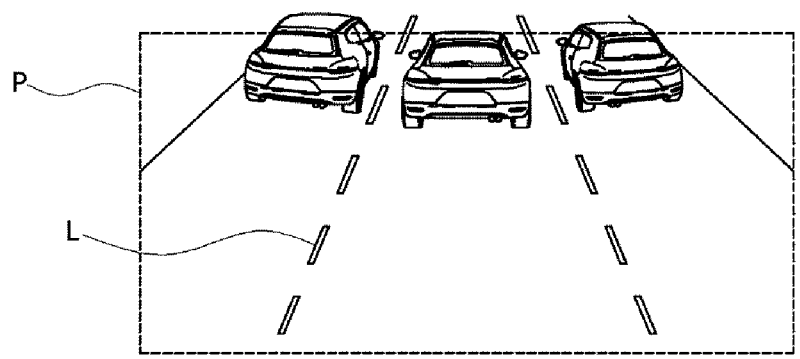
FIG. 3 is a diagram illustrating a state of photographing an image in front of a vehicle in a lane detection method according to an embodiment of the present invention.

FIG. 3 is a diagram illustrating a state of photographing an image in front of a vehicle in a lane detection method according to an embodiment of the present invention.

As shown in FIG. 3, first, acquiring an image P in front of a vehicle using a photographing unit provided in the vehicle is performed. As the photographing unit, various photographing devices such as a vehicular camera and the like may be used, and a type of the photographing unit is not limited.

In the present embodiment of the present invention, a camera mounted in the front of the vehicle is used, and a height of the camera with respect to a road surface and an inclination of the camera to a horizontal plane may be measured in advance.

The image P in front of the vehicle is acquired using such a photographing unit, and a Region Of Interest (ROI) is extracted from the photographed image P. A lane L is included in the corresponding image.

Figure 4:
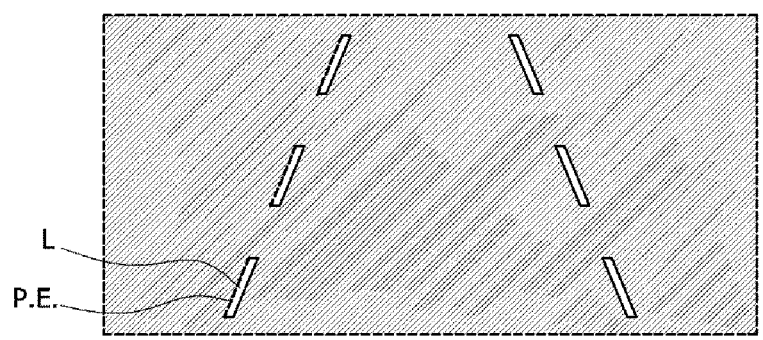
FIG. 4 is a diagram illustrating a state of detecting a positive edge in a lane detection method according to an embodiment of the present invention.
Figure 5:
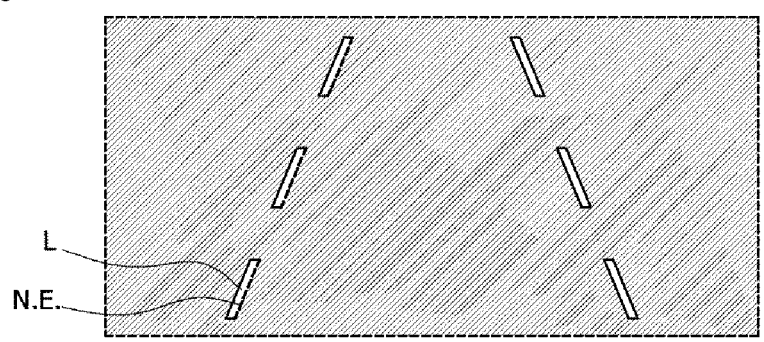
FIG. 5 is a diagram illustrating a state of detecting a negative edge in a lane detection method according to an embodiment of the present invention.

FIG. 4 is a diagram illustrating a state of detecting a positive edge (P.E.) in a lane detection method according to an embodiment of the present invention, and FIG. 5 is a diagram illustrating a state of detecting a negative edge (N.E.) in a lane detection method according to an embodiment of the present invention.

As shown in FIGS. 4 and 5, detecting, from the image acquired in the acquiring of the image in front of the vehicle, a positive edge (P.E.) in which a right pixel has a higher brightness value than a brightness value of a left pixel and detecting, from the image acquired in the acquiring of the image in front of the vehicle, a negative edge (N.E.) in which a left pixel has a higher brightness value than a brightness value of a right pixel are respectively performed.

It can be confirmed that the land L of the acquired image has a brighter color than a pure color of the surrounding road surface. Here, in a case of a left edge of both two edges of the lane L, a right pixel has a higher brightness value than a brightness value of a left pixel with respect to the left edge, and in a case of a right edge thereof, a left pixel has a higher brightness value than a brightness value of a right pixel. Here, an edge in which the right side is brighter than the left side is defined as a positive edge (P.E.), and an edge in which the left side is brighter than the right side is defined as a negative edge (N.E.).

Figure 6:
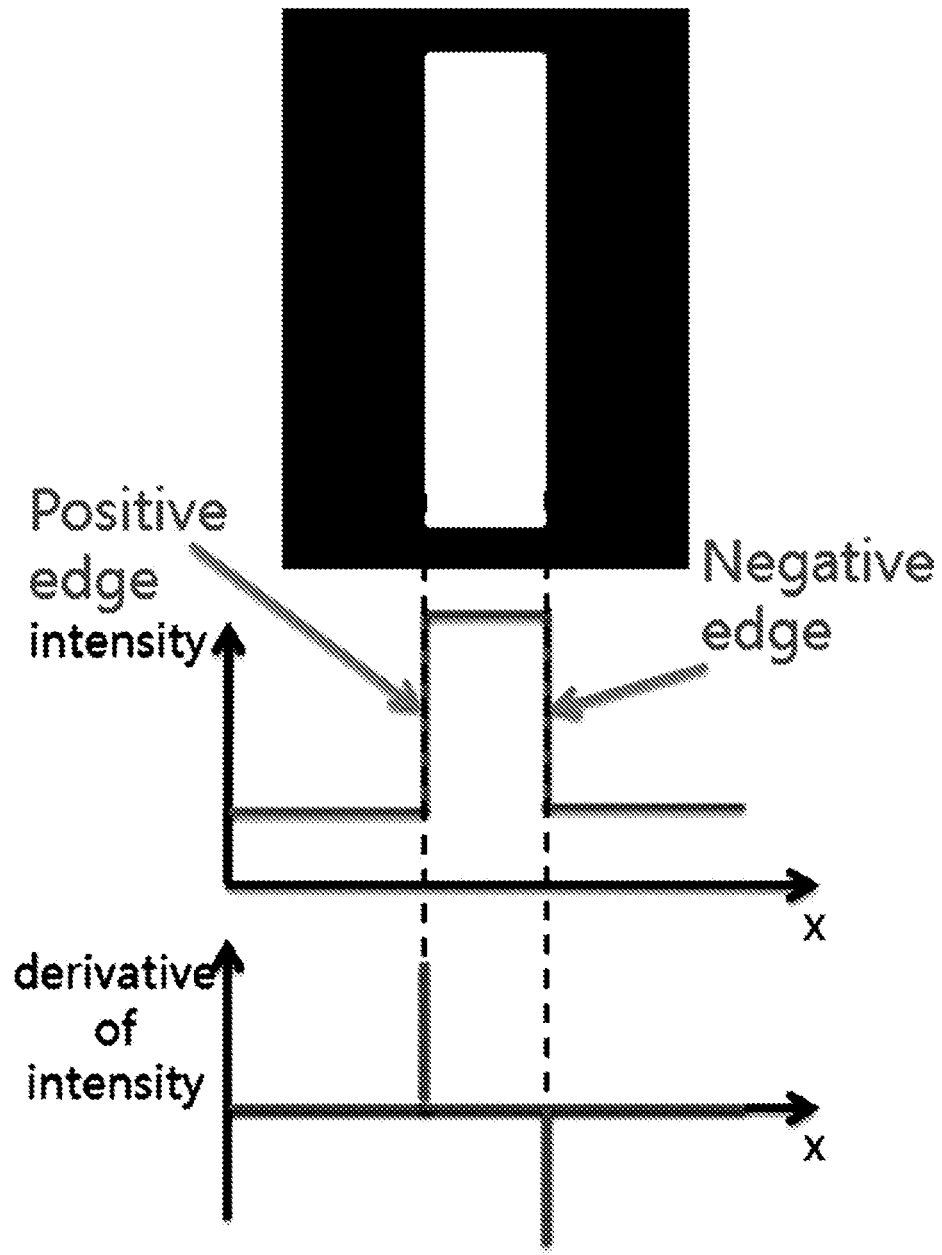
FIG. 6 is a diagram illustrating detection principles of a positive edge and a negative edge in a lane detection method according to an embodiment of the present invention.

FIG. 6 is a diagram illustrating detection principles of a positive edge and a negative edge in a lane detection method according to an embodiment of the present invention.

As shown in FIG. 6, a positive edge of a lane may be detected using a mask such as [−1 0 1; −2 0 2; −1 0 1], and a negative edge may be detected using a mask such as [1 0 −1; 2 0 −2; 1 0 −1].

That is, brightness values of the positive and negative edges of the lane L have a higher value than a brightness value on the adjacent road side, however, the directions of the change values in the brightness values are opposite to each other.

When two edge images are acquired using the two masks in this manner, the corresponding lane is present in a right region of the positive edge and a left region of the negative edge, respectively.

Figure 7:
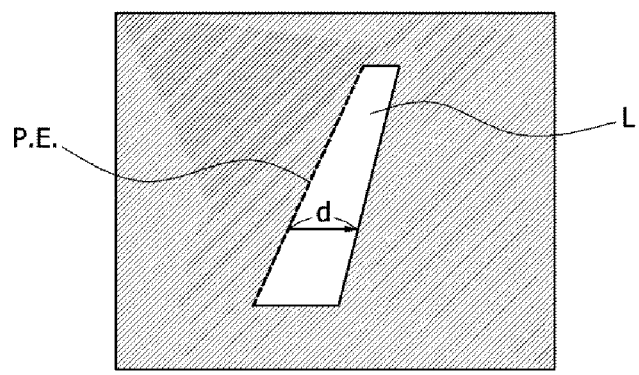
FIG. 7 is a diagram illustrating a state of generating a first expansion image by expanding a pixel by a length corresponding to a width of a lane on a right side of a positive edge in a lane detection method according to an embodiment of the present invention.
Figure 8:
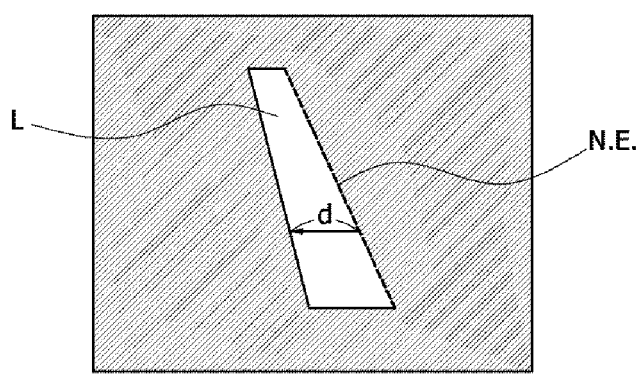
FIG. 8 is a diagram illustrating a state of generating a second expansion image by expanding a pixel by a length corresponding to a width of a lane on a left side of a negative edge in a lane detection method according to an embodiment of the present invention.

FIG. 7 is a diagram illustrating a state of generating a first expansion image by expanding a pixel by a length corresponding to a width d of a lane L on a right side of a positive edge (P.E.) in a lane detection method according to an embodiment of the present invention, and FIG. 8 is a diagram illustrating a state of generating a second expansion image by expanding a pixel by a length corresponding to a width d of a lane L on a left side of a negative edge (N.E.) in a lane detection method according to an embodiment of the present invention.

After detecting the positive edge (P.E.) and the negative edge (N.E.) as described above, generating a first expansion image by expanding a pixel by a length corresponding to a width d of a lane P on the right side of the positive edge (P.E.) and generating a second expansion image by expanding a pixel by a length corresponding to the width d of the lane P on the left side of the negative edge (N.E.) are respectively performed.

That is, when the positive edge (P.E.) of each lane L is expanded by the number of pixels corresponding to the width d of the lane L in the right direction and the negative edge (N.E.) thereof is expanded by the number of pixels corresponding to the width d of the lane L in the left direction, an image of each of the expanded positive edge (P.E.) and negative edge (N.E.) includes all lanes.

For this, before generating the first expansion image and generating the second expansion image, calculating the number of pixels corresponding to the width of the lane may be further included. In addition, in the lane detection system according to an embodiment of the present invention may further include a pixel calculation unit that calculates the number of pixels corresponding to the width of the lane.

In the calculating of the number of pixels corresponding to the width of the lane, the number of pixels corresponding to the width of the lane may be calculated using a height of the photographing unit provided in the vehicle and an inclination of the photographing unit to a horizontal plane. Thus, by applying the calculating of the number of pixels to the generating of the first expansion image and the generating of the second expansion image, the pixel may be expanded.

Figure 9:
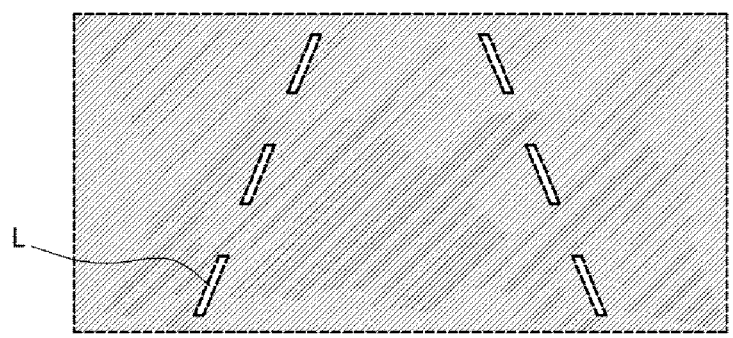
FIG. 9 is a diagram illustrating a state of finally detecting a lane in a lane detection method according to an embodiment of the present invention.

FIG. 9 is a diagram illustrating a state of finally detecting a lane in a lane detection method according to an embodiment of the present invention.

As shown in FIG. 9, in order to detect the land L, detecting the lane L by combining the first expansion image and the second expansion image is performed. In the detecting of the land L, by combining the two images acquired in the generating of the first expansion image and the generating of the second expansion image, the lane L may be finally detected. In this instance, by performing AND operation from the respective images, pixels of the respective lanes may be detected.

As described above, in the lane detection method and system using the photographing unit according to the embodiments of the present invention, it is possible to efficiently perform lane detection.

In addition, it is possible to achieve high accuracy of the lane detection results, thereby improving the safety.

In addition, such detection results can be applied to an Advanced Driver Assistant System (ADAS) such as a Lane Keeping Assistant System (LKAS).

In addition, the lane detection method and system using the photographing unit according to the embodiments of the present invention can be applied even when determining the state of a road surface after detecting and removing the lane.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A lane detection method comprising:
   acquiring an image in front of a vehicle using a photographing device provided in the vehicle;
   detecting, from the acquired image, a positive edge (P.E.) a lane in which a right pixel has a higher brightness value than a brightness value of a left pixel;
   detecting, from the acquired image, a negative edge (N.E.) of the lane in which a left pixel has a higher brightness value than a brightness value of a right pixel;
   calculating the number of pixels corresponding to a width of the lane;
   generating a first expansion image of the lane by expanding a pixel from the P.E. by a length corresponding to the calculated number of pixels on a right side of the P.E., so that the first expansion image has the width of the lane;
   generating a second expansion image of the lane by expanding a pixel from the N.E. by the length corresponding to the calculated number of pixels on a left side of the N.E., so that the second expansion image has the width of the lane; and
   detecting the lane by performing an AND operation from the first expansion image and the second expansion image.

2. The lane detection method of claim 1, wherein the calculating of the number of pixels corresponding to the width of a lane uses a height of the photographing device provided in the vehicle and an inclination of the photographing device to a horizontal plane.

3. A lane detection system comprising:
   a photographing device that is provided in a vehicle to acquire an image in front of the vehicle;
   an edge detection device that detects, from the image in front of the vehicle, a P.E. of a lane in which a right pixel has a higher brightness value than a brightness value of a left pixel and a N.E. of the lane in which a left pixel has a higher brightness value than a brightness value of a right pixel;
   a pixel calculation device that calculates the number of pixels corresponding to a width of a lane;
   an edge expansion device that generates a first expansion image of the lane by expanding a pixel from the P.E. by a length corresponding to the calculated number of pixels on a right side of the P.E. and generates a second expansion image of the lane by expanding the pixel from the N.E. by the length corresponding to the calculated number of pixels on a left side of the N.E.; and
   a lane detection device that detects the lane by performing an AND operation from the first expansion image and the second expansion image,
   wherein both of the first expansion image and the second expansion image have the width of the lane.

* * * * *